United States Patent
Tsou et al.

(10) Patent No.: US 8,311,887 B2
(45) Date of Patent: Nov. 13, 2012

(54) METHODS, DEVICES AND SYSTEMS FOR REAL-TIME INSTANT PRESENCE WITH ADVERTISEMENT (RIPA)

(75) Inventors: I-Wen Winnie Tsou, Palo Alto, CA (US); Hitoshi Matsumoto, Los Gatos, CA (US); Toshiharu Kido, Fujisawa Kanagawa Pref. (JP)

(73) Assignee: Fujitsu Limited, Kawasaki-shi (JP)

( * ) Notice: Subject to any disclaimer, the term of this patent is extended or adjusted under 35 U.S.C. 154(b) by 2568 days.

(21) Appl. No.: 09/870,342

(22) Filed: May 29, 2001

(65) Prior Publication Data

US 2002/0184089 A1 Dec. 5, 2002

(51) Int. Cl.
*G06Q 30/00* (2006.01)

(52) U.S. Cl. .............. 705/14.57; 705/14.58; 705/14.64

(58) Field of Classification Search .............. 705/14.57, 705/14.58, 14.64
See application file for complete search history.

(56) References Cited

U.S. PATENT DOCUMENTS

| | | | |
|---|---|---|---|
| 5,459,306 A | 10/1995 | Stein et al. | |
| 5,557,721 A | 9/1996 | Fite et al. | |
| 5,819,285 A | 10/1998 | Damico et al. | |
| 6,034,621 A | 3/2000 | Kaufman | |
| 6,144,848 A | 11/2000 | Walsh et al. | |
| 6,157,814 A | 12/2000 | Hymel et al. | |
| 6,178,331 B1 | 1/2001 | Holmes et al. | |
| 6,178,446 B1 | 1/2001 | Gerszberg et al. | |
| 6,182,050 B1 | 1/2001 | Ballard | |
| 6,587,835 B1* | 7/2003 | Treyz et al. | 705/14 |
| 6,714,791 B2* | 3/2004 | Friedman | 455/456.1 |
| 6,968,179 B1* | 11/2005 | De Vries | 455/414.1 |
| 2001/0047294 A1* | 11/2001 | Rothschild | 705/14 |
| 2002/0026355 A1* | 2/2002 | Mitsuoka et al. | 705/14 |
| 2002/0065718 A1* | 5/2002 | Otani et al. | 705/14 |
| 2002/0087631 A1* | 7/2002 | Sharma | 709/203 |
| 2002/0164962 A1* | 11/2002 | Mankins et al. | 455/99 |
| 2003/0004743 A1* | 1/2003 | Callegari | 705/1 |

FOREIGN PATENT DOCUMENTS

| | | |
|---|---|---|
| JP | 08-102790 | 4/1996 |
| JP | 2000-324542 | 5/1999 |
| JP | 2000-299888 | 10/2000 |
| JP | 2001-147881 | 5/2001 |
| WO | WO 01/29675 | 4/2001 |

OTHER PUBLICATIONS

*Wireless Instant Messaging*, Aug., 2000, www.tegic.com, by Jon Bylin, Tegic Communications (41pp).
Translation of Office Action, Japanese Patent Application No. 2002-155815, 5 pages, Mailed Nov. 13, 2007.

(Continued)

*Primary Examiner* — Michael Bekerman
(74) *Attorney, Agent, or Firm* — Baker Botts L.L.P.

(57) ABSTRACT

Methods, devices and systems for Real-time Instant Presence with Advertisement (RIPA) using an instant messaging topology with wireless technology to instantly setup and update of presence information of an instant messaging user. The invention provides location information of a business and other business information to a wireless instant messaging user/customer of the business, and obviates the need for the users/customer to manually enter presence information of the business. The invention further provides methods for promotion, advertising and network marketing of a business using presence information sent to instant messaging users and instantly propagated through instant messaging address lists.

3 Claims, 4 Drawing Sheets

OTHER PUBLICATIONS

Eda, Hiroki, "Portable Terminal," Navigator on the Palm, Nikkei Electronics, Japan, No. 721, Nikkei Business Publications, Inc., 9 pages, Received Dec. 13, 2007.

Nakamura, Nagatoshi, "Development of Agent Service Infrastructure," NTT Technical Review, vol. 13, No. 2, The Telecommunications Association, 4 pages, Received Dec. 13, 2007.

Nagao, Katashi, "Hyper Campus: A Campus Navigation/Guidance System that is Provided with Situation Awareness and Personalization Capabilities," IPSJ SIG Notes, vol. 97, No. 17, Information Processing Society of Japan, pp. 27-38, Dec. 5, 1997.

Nagao, Katashi, "Agent Augmented Reality: Agents Integrate the Real World with Cyberspace," Sony Computer Science Laboratory Inc., Journal of Information Processing Society of Japan, vol. 38, No. 4, Information Processing Society of Japan, pp. 1-25, Received Nov. 13, 2007.

Kaneyoshi, Akio, "Ubiquitous Information Service Systems for Business Application," IPSJ SIG Notes, vol. 99, No. 97, Information Processing Society of Japan, pp. 33-38, Nov. 26, 1999.

Honma, Kenji, "Internet Telephone Guide," Nikkei Personal Computing, Nikkei Business Publications, Inc., 10 pages, Received Dec. 13, 2007.

* cited by examiner

METHODS, DEVICES AND SYSTEMS FOR REAL-TIME INSTANT PRESENCE WITH ADVERTISEMENT (RIPA)

FIELD OF THE INVENTION

The current invention relates to methods, devices and systems for "instant messaging" and advertising, and is particularly related to methods, devices and systems for providing presence information with advertising to instant messaging users.

BACKGROUND OF THE INVENTION

The explosive growth of the Internet and wireless communication in recent years has led to a commensurate growth in the number of Internet users using "instant messaging" to communicate in real-time with other Internet users through wired and wireless means. "Instant messaging" (IM) refers to a service and software that enables a user to create a private electronic "chat" over the Internet, or other suitable network, in order to communicate in real-time with another user. Wireless mobile communication has also experienced explosive growth as cellular telephones and other wireless devices and related services have become less expensive for the consumer. Increasingly, service providers of cellular telephones and other portable wireless devices have supplied services and devices to provide wireless Internet access. One such popular device is the PDA (Personal Digital Assistant) which is a small, hand-held computer device used to write notes, to maintain an appointment calendar and an address book. Services such as instant messaging, once available only to wired Internet users in their homes and offices, have become available for users of such wireless devices allowing instant messaging communication in real-time even while mobile.

In order to facilitate communication with other instant messaging users, instant messaging service providers and instant messaging software typically provide the capability for a user to maintain a private address list of other instant messaging users. This address list is essentially a list of contacts stored in an electronic address book. Known instant messaging services typically provides features that alert an instant messaging user to the status of users who appear on the address list. Such status information is commonly referred to as "presence" or "presence information". Presence commonly refers to information about the state of an instant messaging user, for instance, whether the user is present and available to receive instant messages. If an instant messaging user is not available for instant messaging (e.g. offline) then known instant messaging services provide the capability for other instant messaging users to send a text message to the unavailable user. Systems provided by such services may also provide the capability for an instant messaging user to manually input other information as part of the presence information and make it available to other users. The capability to manually designate presence information in order to enable or disable (e.g. "busy") receipt of instant messages or other data, may also be provided.

A drawback associated with known methods and systems for instant messaging is that presence information is not updated instantly with location information. Location information includes information about where the instant messaging user is situated. This information may be useful for a user who wants to provide information about the user's current location to other users. A feature to show a user's location (e.g. for a mobile user) as part of their presence information is typically not provided or requires cumbersome manual input. PDA wireless devices, for example, typically require the user to input location information manually by touching the PDA screen with a pointing-type device. One typical PDA pointing-type device is a "stylus" which is capable of selecting a letter, symbol, graphical pattern, elements of a graphical pattern, or other menu item. A drawback with the use of conventional cellular telephones with Internet capability is the requirement to enter information through use of a numeric keypad for data entry.

A problem with these manual methods is that updates to the location part of the presence information are not done instantly and automatically. The known methods, devices and systems require a significant effort for the user to continually manually update his or her location information as it changes throughout the day. The manual methods are cumbersome, time consuming and prone to error, even in view of advancements in artificial intelligence that reduce manual keystrokes.

The known methods are especially burdensome for mobile users who access instant messaging through a wireless device while traveling. A problem for mobile users is that the ability to manually input information into a wireless device is limited by the inherent characteristics of being mobile. Mobile users who travel, for instance, are restricted in the ability to do manual entry by movement. For the driver of a vehicle, having to do manual entry on a wireless device is a major distraction and may violate legal prohibitions against driving while distracted. Thus, there is also a need to automatically update the location information for an instant messaging user.

Furthermore, due to the inherent limitations of manual input of presence information and the limited text input capability, known methods and systems also do not provide updated and detailed presence information. Another problem contributing to these shortcoming is that known methods require the instant messaging user to determine the location information to be entered as part of the presence information, and to manually update the location information when moving to a new location. For the known methods, unless a first instant messaging user manually enters the location information and location details, a second instant messaging user who has the first user on their address list will not receive the detailed location information for the first user; and will not be instantly updated when the location of the first user changes. Since such manual methods may be burdensome or impossible to perform, an instant messaging user may be presented with incomplete, outdated or inaccurate location information for the presence information of other users on their address list. Therefore, there is a need for methods and systems for an instant messaging user for providing and updating their location information for their presence information instantly, with less distractions, more accurately, and with more useful location information (e.g. addresses, directions, links to maps, etc.).

Another drawback with known methods and systems is that instant messaging services lack services that generate real revenue by providing a beneficial medium for targeted advertising to offset the cost of providing the service. Advertising that is conventionally available to instant messaging users fails to take full advantage of the opportunities for a business to conduct targeting advertising and promotion to wireless instant messaging users. Another problem is the failure to provide a method for a business to take advantage of network marketing to instant messaging users who may not have visited the business but have an instant messaging user on their address list who has visited the business (e.g. a customer). Another drawback of known methods is that adequate information may not be obtained and provided to a business in order to assess the effectiveness of the advertising, promotions, and network marketing of the business.

Instant messaging users represent a potential advertising market for businesses to tap. For known methods, advertisements may appear on the Internet browser or instant messaging screen that is displayed for an instant message user. The effectiveness of this type of advertising is related to the number of potential customers who view the advertising and whether the viewers would be interested in the product or service that the business provides. A drawback with known methods of advertising by a business to instant messaging users is that such methods may be only marginally effective where the users or the other users on their address list have no prior connection, relatedness or familiarity to the business which could attract the users attention. Non-targeted ads may be also an annoyance to an instant messaging user, especially to a wireless instant messaging user who has a small display viewing area on the wireless device. Non-targeted advertising also contributes to advertising clutter and wastes valuable bandwidth.

An instant messaging user may be more likely to trust recommendations received from other user who are on their address list regarding businesses the other users patronize. A user/consumer usually has a certain degree of similarity with their acquaintances, such as ages, location, interest, taste, etc.

Therefore, there is also a need for methods and systems for advertising that use instant messaging and presence information to provide the ability for businesses to send targeted advertisements to wireless customers and other visitors, and to instantly propagate such advertisements to a network of people.

SUMMARY OF THE INVENTION

The aforementioned drawbacks associated with known methods, devices, and systems are overcome by the present invention.

An object of the present invention is to provide methods and systems for Real-time Instant Presence with Advertisement (RIPA) using an Instant Messaging (IM) topology and wireless technology to automatically setup and instantly update an instant messaging user's presence information. A further object of the present invention is to instantly provide location information as part of the presence information. A still further object of the present invention is to instantly provide advertising along with the presence information and to propagate the information to other instant messaging users.

Another object of the present invention is to provide a method for wireless promotion, advertising and network marketing of products and services of a business to instant messaging users who visit the business, (e.g. a customer), and to other instant messaging users who have the visitor on their instant messaging address list. A further object of the present invention is to provide alerts to an instant messaging user regarding special promotions from businesses that the user or those on the user's address list visit.

A further object of the present invention is to provide for instant automatic updating of the location information part of an instant messaging user's presence information without the user having to manually input or select the information.

A further object of the present invention is to provide a methodology of acquiring statistics of advertisement efficiency for advertising directed toward instant messaging users through the use of address lists of instant messaging users. Another object is to provide this statistical information to the advertiser and service provider.

Another object of the present invention is to provide a method and system for sending dynamically updated promotions to instant messaging users.

These and other objects are realized by the present invention, which, in its basic form comprises a method of establishing presence information for a first instant messaging user. The present invention also entails a business client system for sending presence information through wireless communication to a wireless device of an instant messaging user who is present at the business. In another aspect, the business client system receives user profile information from the instant messaging user who is present at the business. In one embodiment, the business client system transmits business information as part of the presence information. In another aspect, the business information transmitted includes location information. In another embodiment, the business information includes promotional information of the business. In one embodiment, the business information includes an advertisement for the business. The present invention also entails an instant messaging client method installed in an instant messaging user device for receiving and processing presence information from a business location. In one aspect, the instant messaging client provides for transmitting of information from an instant messaging user to the business client system. In another aspect, the instant messaging client system provides for receiving the presence information of a first instant messaging user who has been placed on an address list of a second instant messaging user. In a further aspect, the presence information includes information about a business that the first instant messaging user visits.

The present invention also entails systems and methods for acquiring statistics of advertisement efficiency for advertising directed toward instant messaging users through the use of address lists of instant messaging users. In another embodiment, a method and system for transmitting dynamically updated promotions to instant messaging users is provided.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which.

DETAILED DESCRIPTION OF THE INVENTION

The present invention is designed to provide methods, devices and systems for using an Instant Messaging (IM) topology with wireless technology to instantly setup and update an instant messaging user's presence information to include location information for the location of the instant messaging user. The present invention also provides for propagation of the presence information that includes location information through an instant messaging user address list. The present invention also provides a method for wireless promotion, advertising and network marketing of a business to instant messaging users.

The present invention will now be described with reference to FIGS. 1-4. The present invention will also be described by way of an example of a beneficial use of the present invention that overcomes drawback of the present methods; however, the present invention is not limited to the example.

Figure 1:
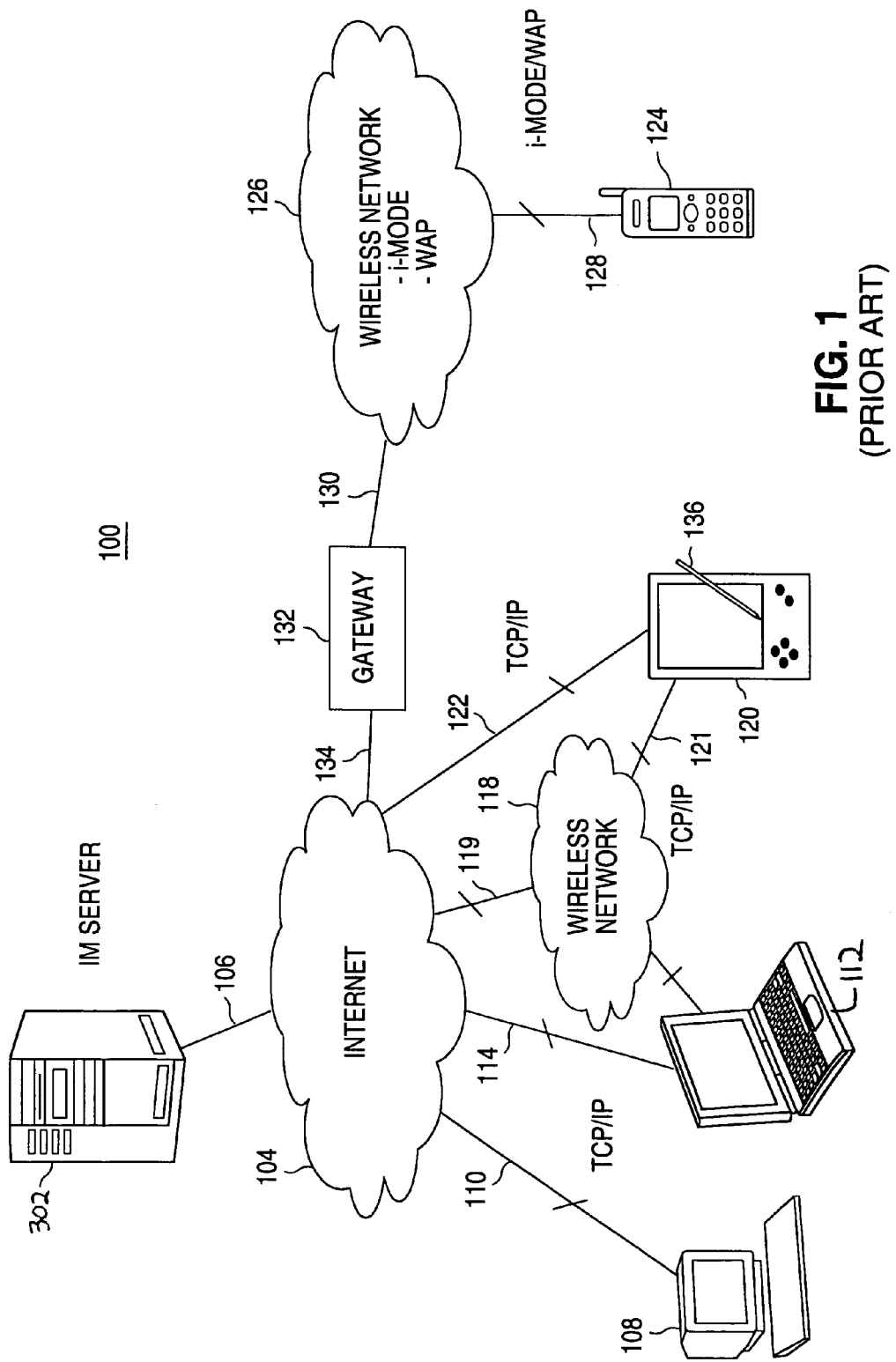
FIG. 1 is a functional block diagram of the existing conventional system architecture which may be used to practice the present invention.

FIG. 1 is a functional block diagram of the existing conventional system architecture which may be used to practice the present invention. The components of the exemplary architecture 100 includes an instant messaging server (IM Server) 302 connected to the Internet 104 via line 106. The present invention assumes the instant messaging users have an Internet service provider that provides a connection to the Internet 104. FIG. 1 shows various exemplary devices a user may use to connect to the Internet 104. The devices include a desktop personal computer (PC) 108 and portable computer 112 connected to the Internet 104 via TCP/IP lines 110 and 114 respectively. The portable computer 112 is also shown optionally connected to a wireless Network 118 for connection to the Internet 104, shown on line 119. A wireless Network 118 is also shown to provide a TCP/IP connection 121 to a PDA 120. A typical PDA stylus device is identified as 136 and is used for selecting elements on a touch screen of the PDA 120. FIG. 1 also shows PDA 120 connected to the Internet 104 via a TCP/IP connection on line 122. A PDA 120 can also have cellular telephone capability, although in FIG. 1 a "Cellular" telephone with Internet capability is identified as 124 in FIG. 1, and shown separately.

Manual entry on the PDA 120, using either a keyboard or the stylus 136, or on Cellular phone 124, using a keypad, has the drawback of being cumbersome and time consuming. Exemplary protocols "i-Mode" and "WAP" are shown on line 128 for connecting Cellular phone 124 to wireless network 126. Any suitable protocol can be used and are known to those skilled in the art. The wireless network 126, as shown in FIG. 1, is connected via line 130 to a gateway 132 which connects to the Internet 104 via line 134.

The devices for the underlying existing architecture for the present invention are not limited to those shown. Any suitable device with the capability to provide instant messaging over the Internet can be used, as is known in the art.

Figure 2:
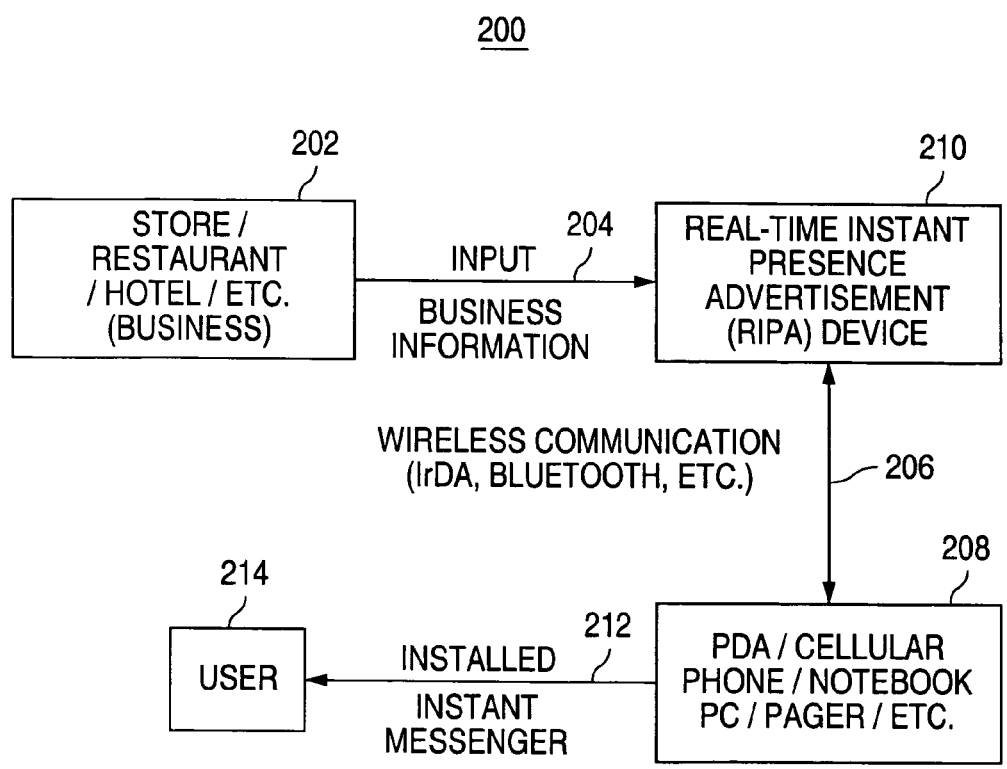
FIG. 2 is a functional flow chart of an embodiment of the present invention.
Figure 3:
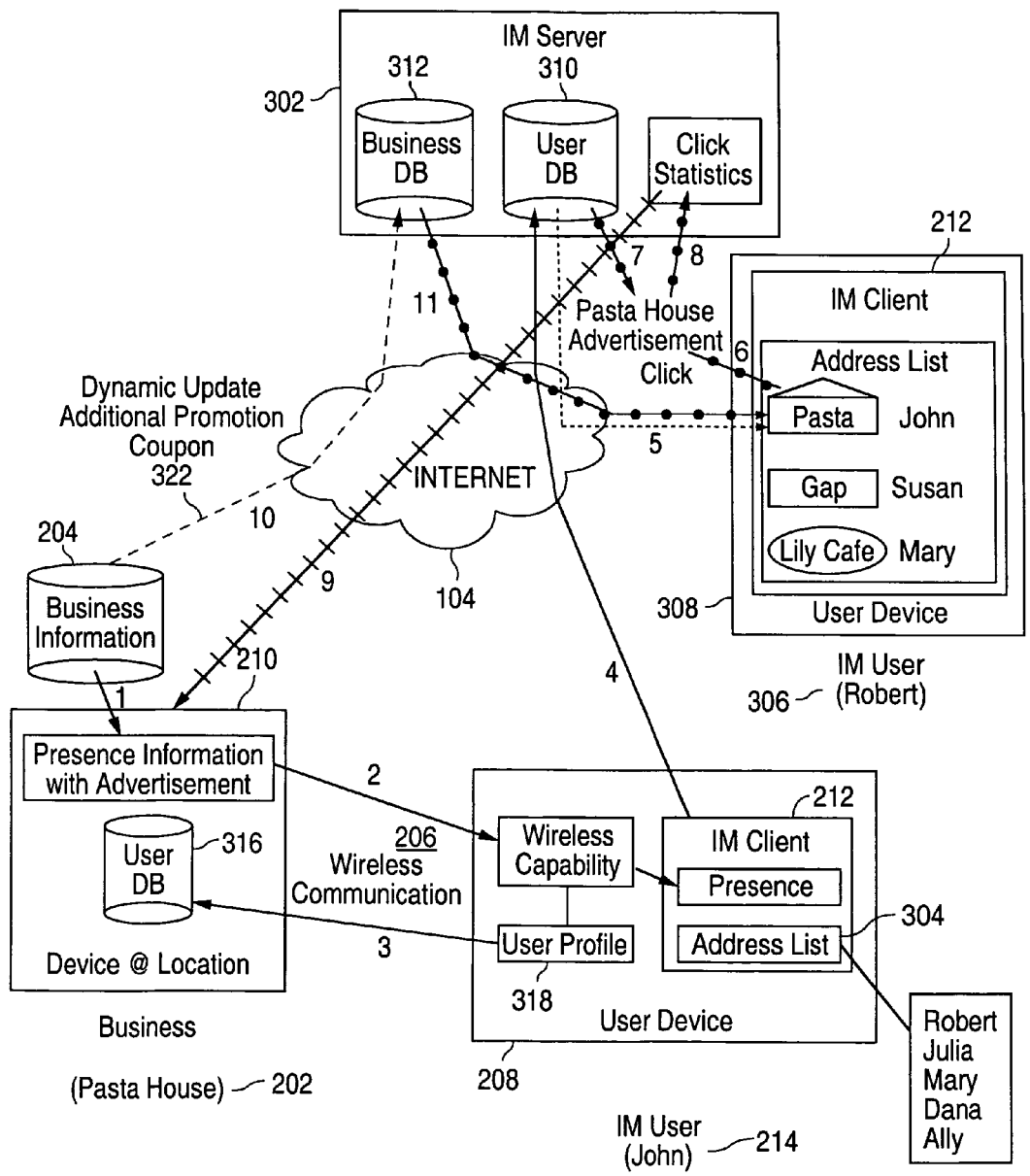
FIG. 3 is a flow diagram depicting the process steps and systems of the preferred embodiment of the present invention by way of an example of a beneficial use of the present invention.
Figure 4:
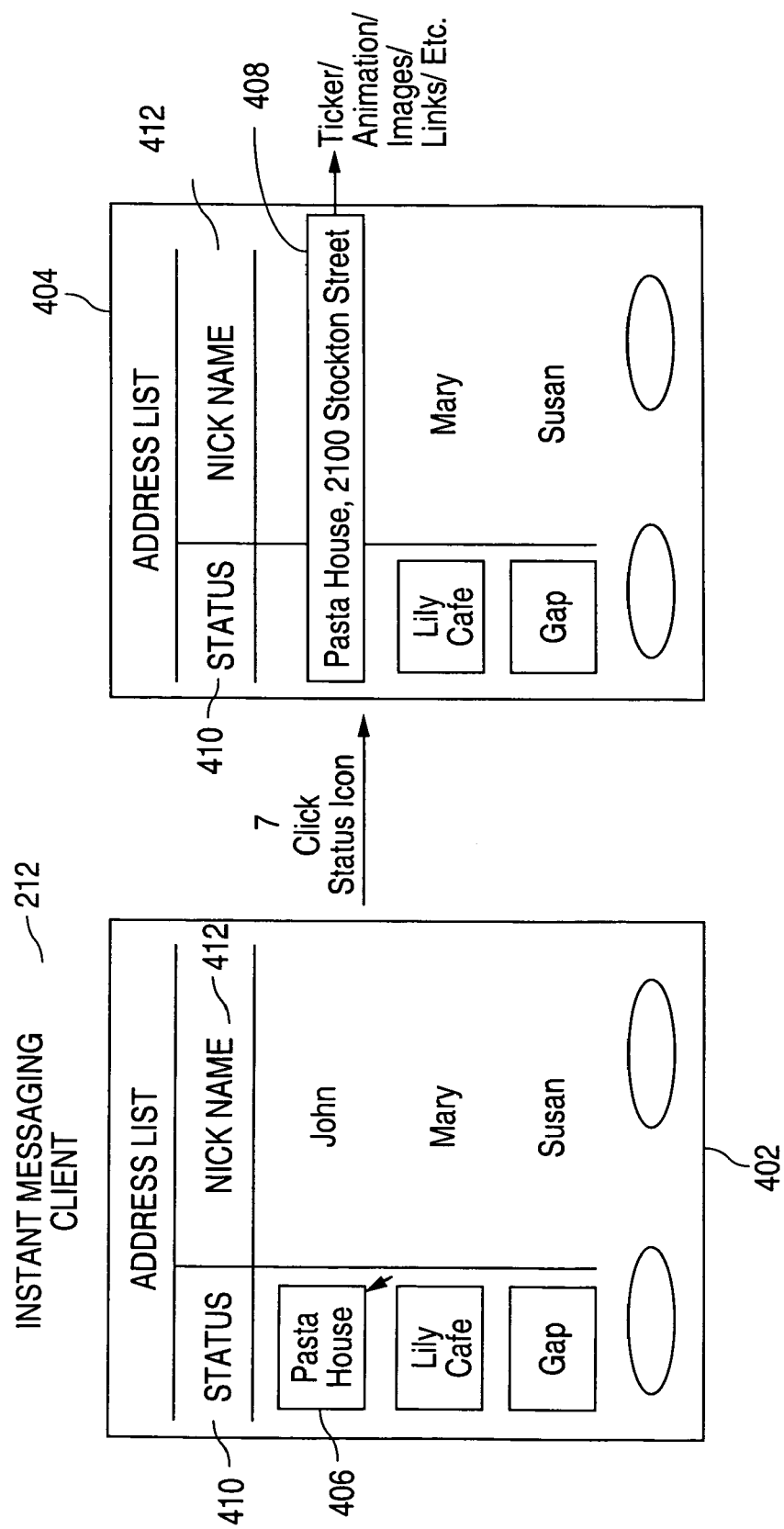
FIG. 4 is a diagram depicting an example of instant messaging address lists for the preferred embodiment of FIG. 3.

FIGS. 2-4 show embodiments and aspects of the present invention. The existing system architecture of the Internet and instant messaging, as shown in FIG. 1, may be used to practice the embodiments shown in FIG. 2-4, as described herein. It is assumed for purposes of the invention that the instant messaging users have service providers that supply an Internet connection.

FIG. 2 is a functional flow chart 200 of an embodiment of the present invention. The business client ("RIPA") device of the present invention is identified in FIG. 2 as 210. An exemplary business, is identified as 202 in FIG. 2 is also shown as a store/restaurant/hotel location. However, business 202 is not limited to these types of businesses; business 202 can be any suitable business that can practice the present invention. For this overall flow chart 200, the business 202 inputs business information 204 into the business client (RIPA) device 210. The business 202 preferably inputs the business information 204 of the business at the business 202 location or remotely using any suitable means. The business client (RIPA) device 210 stores and processes the business information which can include, but is not limited to, one or more of the following: an introduction and description of the business, the business address and phone number, and other advertising and promotional information. The business client (RIPA) device 210, is placed on the business 202 premises by the business 202 owner and is preferably near where visitors and customers of the business would pass by or be present.

In the exemplary embodiment of the present invention a user 214 has a wireless device, shown as 208 in FIG. 2. The instant messenger "IM client" of the present invention, identified as 212, has previously been installed into the wireless device 208. In operation, the RIPA device 210 communicates with the wireless device 208 of the user 214 when the instant messaging user 214 is present at the business 202 premises and the wireless device 208 is within range to communicate successfully with the RIPA device 210. The RIPA device 210 engages in wireless communication with a wireless device 208 of user 214. The RIPA device 210 may send information to the user 214's wireless device 208 and may receive information from wireless device 208 along a path shown as 206. Exemplary wireless communication protocols "irDA, Bluetooth, etc." are shown for communication between the RIPA device 210 and a wireless device 208, any suitable wireless protocol can be used and are known to those skilled in the art.

Typically, user 214 would be in the business 202 premises, learn through by some type of promotional sign or other means that the business 202 has the capability to communicate from the RIPA device 210 to the user wireless device 208. User 214 may have a choice as to whether to enable the wireless communication 206 to the user 214's wireless device 208 or the user 214 may agree to automatically allow communication between RIPA device 210 and user device 208.

The installed IM client 212 of the present invention, among other things, enables instant messaging user 214's wireless device 208 to have the capability of receiving information from the RIPA device 210 and sending information to the RIPA device 210. Exemplary devices for wireless device 208 are shown in FIG. 2; any suitable device capable of storing and executing an installed instant messenger client 212 of the present invention can be used.

FIG. 3 is a flow diagram of the process steps of the preferred embodiment of the present invention by way of an example of a beneficial use of the present invention. FIG. 3 also illustrates embodiments of the systems and devices of the present invention. For the process steps of the preferred embodiment of the present invention method is also shown in FIG. 3, reference numerals 1-11 represent Steps 1-11 described below.

FIG. 3 shows a business, identified as 202. Business 202, which is identified in the example in FIG. 3 as "Pasta House", is shown as being located on the premises; wherein the business and premises (location) would both be identified as 202. The present invention is not however, limited to businesses where the premises are co-located with the business 202.

In Step 1, the business (Pasta House) 202 sets up the business client RIPA device 210 by inputting business information 204. The business 202 preferably inputs the business information 204 at the business 202 location or remotely using any suitable means. The business information 204 may include, but is not limited to, one or more of the following: an introduction to the business, a description of the business, an advertisement, a special promotion, and the address and phone number of the business 202 location and other suitable related information (e.g. email address and web site address).

At Step 2, an instant messaging user 214, identified as "John" in FIG. 3, has entered into the business location 202, identified as "Pasta House" and has in his possession a wireless device 208. The instant messenger "IM client" of the present invention, identified as 212, has previously been installed into the wireless device 208 of user (John) 214. In operation, the wireless device 208 is within range for communication with the RIPA device 210; or user (John) 214 may move the wireless device 208 within range. User (John) 214 may previously consent to automatically receive communication from a RIPA device 210 to his wireless device 208 as part of an agreement that accompanied installation of the IM client 212. In the preferred embodiment, for privacy reasons, user (John) 214 is required to take some step (e.g. click a key on the device) to enable his wireless device 208 to accept transmissions from a RIPA device 210. The enabling of the wireless device 208 may occur before user (John) 214 enters the business 202 premises.

In operation, once instant messaging user (John) 214 has enabled wireless communication, the RIPA device 210 transmits business information 204 to his wireless device 208. This wireless transmission from the RIPA device 210 to wireless device 208 is by wireless communication using a wireless protocol. Exemplary wireless communication protocols include "irDA" and "Bluetooth"; any suitable wireless protocol can be used and are known to those in the art. The business information 204 sent from the RIPA device 210 is processed by the IM Client 212 installed in wireless device 208 of user (John) 214, and thereby sets the location for the presence information of user (John) 214 to be the business (Pasta House) 202 location.

In order to do instant messaging, instant messaging user (John) 214 is required to enter and store a user profile 318 in his wireless device 208. The user profile 318 contains contact information such as instant messaging user name and email address. At Step 3, user (John) 214 may consent to transmit his stored user profile 318 to the RIPA device 210. Business 202 may provide some type of promotional incentive to instant messaging users in exchange for their consent to transmit the user profile. In operation, the RIPA device 210 receives a user profile 318 and stores the user profile 318 into the business user database (user DB), as identified as 316 in FIG. 3.

For the example shown in FIG. 3, instant messaging user (John) 214 has the IM client 212 of the present invention installed in wireless device 208. As shown in FIG. 3 the IM client 212 maintains both the "presence" information and private address list 304 of user (John) 214. As is known in the art, an instant messaging service provider enables a subscriber to create an address list 304 that includes the identified instant messaging "screen names" (also commonly referred to as Nick names) employed by other instant messaging users with whom a subscriber wishes to communicate and displays the presence information of those pre-selected users. The address list 304 for user (John) 214, in the example shown in FIG. 3 includes Robert, Julie, Mary, Dana and Ally.

For Step 4, once the User (John) 214 receives his updated presence information in Step 2, the new presence information which includes location information (e.g. Pasta House) will be sent by the "IM client" 212 of the present invention to the IM server 302 via the Internet 104.

For Step 5, the IM server 302 will notify one or more additional instant messaging users who have added user (John) 214 to their address list that there is an update for the presence information for user (John) 214. The IM server 302 will also send User (John) 214's updated presence information from the IM server user database (User DB) 310 to the additional instant messaging users. FIG. 3 shows an additional User 306, identified as "Robert". The device of additional user (Robert) 306, is identified as 308 in FIG. 3. In operation, additional user (Robert) 306 has previously installed the instant messaging "IM client" 212 of the present invention in device 308. Preferably, device 308 is a wireless device, however, device 308 may also be a suitable wired device.

As shown in Step 6 in FIG. 3, device 308 of user (Robert) 306 may display the updated presence information including location information of user (John) 214. In the example in FIG. 3, the updated presence information, including location information, is displayed as ("Pasta House") 202 logo or icon. User (Robert) 306 may select (e.g. click on) the new presence information (e.g. Pasta House icon) to get additional business information of the business 202 "Pasta House".

For Step 7, when user (Robert) 306 clicks the presence information of user (John) 214, the IM server 302 may also "push" a promotional information for the business ("Pasta House") 202 to the device 308 of user (Robert) 306 wherein the information is processed by IM client 212.

FIG. 4 illustrates exemplary instant messaging address lists associated with Steps 6 and 7. For the preferred embodiment, as shown in the example in FIG. 4, the address list displays two columns, status 410 and user "Nick name" 412. Nick name 412 is also commonly referred to as "screen name", and identifies the instant messaging member of a user's address list. The information under status 410, in the example in FIG. 4, is used to display presence information for each member of the address list. FIGS. 3-4 show only an exemplary address list display. Any suitable address list display can be used.

The address list 402 in FIG. 4 shows the address list after Step 6. In the example, under status 410 there is a status icon 406 "Pasta House" which shows user (John) 214's presence information. At Step 7, for this example, when the icon 406 in 402 is selected, as shown by the arrow in FIG. 4, the IM client 212 of the present invention will update the address list 402 so that it is displayed as updated address list 404. The updated presence information 408 for user John 214 is displayed in the updated address list 404. This updated presence information 408 includes additional business information which may include, but is not limited to, location name, location address, and promotional information for business "Pasta House" 202. As shown in the example in FIG. 4, this updated presence information 408 may be displayed in various ways which may include, but is not limited to, text, a rotating ticker, animation, images and internet links; any suitable display may be shown.

In Step 8, a statistics aspect is shown wherein, in operation, user (Robert) 306 selects the presence information for user (John) 214. Thereafter, the presence information of user (John) 214 may be sent to the IM server 302 wherein the information is processed by suitable means for statistical purposes. A "click" statistics report may also be generated by IM server 302, which contains statistics associated with the selection of presence information by instant messaging users.

In Step 9, a "click" statistics report stored in IM server 302 is sent to the business ("Pasta House") 202. The reports can be at selected intervals (e.g. weekly, monthly, or quarterly). The click statistics report is preferably sent to the business 202 via the Internet 104 as shown in FIG. 3, however, the report can also be emailed or sent in paper form to the business 202.

In Step 10, if the business 202 has Internet access capability, the business 202 can send dynamic updates 322 with additional promotion or coupon information to the IM server 302 and maintained in the business (database) DB 312 as shown in FIG. 3.

For Step 11, if the device 308 of user (Robert) 306 continues to display user (John) 214's presence information on device 308, then user (Robert) 306 can obtain the updated presence information for user (John) 214. For another embodiment, user (Robert) 306 is presented with an option to subscribe to additional information about the business (Pasta House) 202 location in the presence information. If user (Robert) 306 subscribes then user (Robert) 306 may receive additional promotional information, that may include advertisements, that the business (Pasta House) 202 transmits to the IM server 302 in the future to be maintained in the business DB 312. User (Robert) 306 may receive these promotions and advertisements even after the location of user (John) 214 in the presence information is no longer set at business (Pasta House) 202. Thus, for this aspect, the promotions may continue to be sent to user (Robert) 306 independently of the current location information of user (John) 214 shown on the address list of user (Robert) 306. In another embodiment, the promotions of business 202 may also be sent to user (Robert) 306 even if user (John) 214 is not listed as a member of the address list of user (Robert) 306.

Thus, for the present invention, presence information is updated instantly. This overcomes the drawbacks of the manual methods by reducing the time and effort associated with manual entry of presence information which is especially cumbersome for wireless devices with limited manual entry methods and in a mobile environment. Also, promotions and advertisement may be targeted to instant messaging user (John) 214 and to additional instant messaging users (e.g. user (Robert) 306 for the example in FIG. 3) who may have some relationship with user (John) 214 that warranted putting user (John) 214 on their address list. This targeted advertising and promotion overcomes the drawbacks of the known methods, by providing a beneficial medium for targeted advertising and can result in real revenue for the business in acquiring customer who have familiarity with existing customers of the business, in order to offset the cost of providing the instant messaging service While the present invention has been described in connection with exemplary embodiments thereof, those skilled in the art will appreciate that the invention is not limited to the embodiments described, and that modifications of the exemplary embodiments may be made without departing from the spirit and scope of the appended claims. Thus, the foregoing description is to be regarded as illustrative instead of limiting.

What is claimed is:

1. A method of advertising comprising:

sending presence information, including physical location information of a business, to a visiting instant messaging user who visits said business and to one or more instant messaging users who list said visiting instant messaging user on an instant messaging address list, wherein said physical location information of said business that is sent to said visiting instant messaging user comprises one or more of the following: an address, phone number, directions to said location, email address information of said business, and one or more links to Internet websites; and displaying part of said presence information to said visiting instant messaging user and to said one or more instant messenger users;

wherein said part of said presence information includes a link to advertisements for said business.

2. The method of claim 1 wherein said business sends dynamic updates with additional promotions to said visiting instant messaging user and said one or more instant messaging users.

3. The method of claim 1 comprising the further step of linking said one or more instant messaging users to a website, wherein said users can subscribe to additional information about said business; wherein said subscribing user receives said additional information regardless of whether said presence information of said visiting instant messaging user has been updated.

\* \* \* \* \*